S. NICOLSON.
MACHINE FOR DISINTEGRATING FIBROUS SUBSTANCES.
APPLICATION FILED SEPT. 13, 1917.

1,326,685.

Patented Dec. 30, 1919.

INVENTOR
Samuel Nicolson.
BY
his ATTORNEY

UNITED STATES PATENT OFFICE.

SAMUEL NICOLSON, OF MAITLAND, VIA GORE, NEW ZEALAND.

MACHINE FOR DISINTEGRATING FIBROUS SUBSTANCES.

1,326,685. Specification of Letters Patent. Patented Dec. 30, 1919.

Application filed September 13, 1917. Serial No. 191,250.

*To all whom it may concern:*

Be it known that I, SAMUEL NICOLSON, a citizen of the British Empire, residing at Maitland, via Gore, Dominion of New Zealand, have invented new and useful Improvements in Machines for Disintegrating Fibrous Substances, of which the following is a specification.

Figure 1:
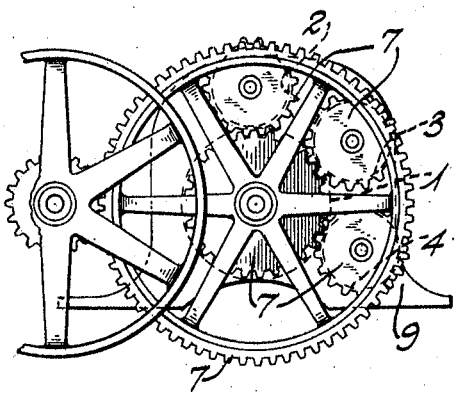
Figure 3:
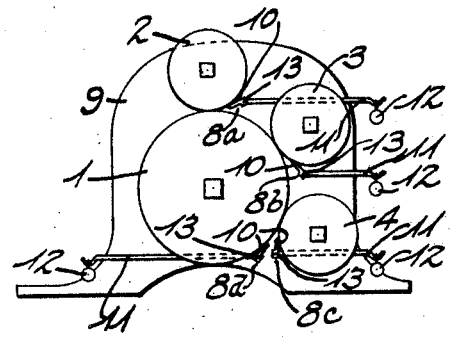
Figure 2:
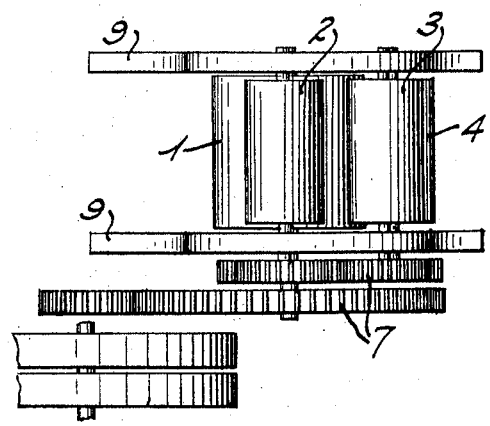
Figure 4:
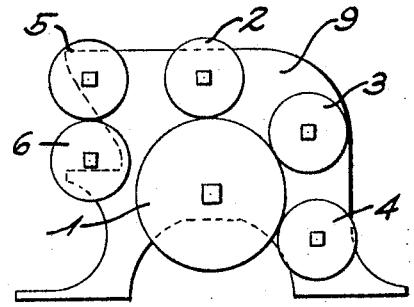

This invention relates to improvements in machines for disintegrating fibrous substances such as *Phormium tenax* of New Zealand and the like for making rope and twine and plants such as the yellow broom into pulp for making paper. The object of these improvements is to prevent the fiber of the plants treated from being cut or bruised and from crossing each other so that they get a uniform dressing and a better quality is turned out. These objects are attained by the mechanism illustrated in the accompanying drawings in which Figure 1 is a side elevation showing the method of driving the rollers, Fig. 2 is a plan view of the machine, Fig. 3 is a side sectional elevation showing the rollers, Fig. 4 is a side sectional elevation showing a modification with extra rollers for treating broom and the like for wood pulp. The same numerals refer to the same parts throughout the several views.

The side plates 9 constitute the framework of the machine. In bearings in the framework are journaled one smooth main roller 1 and a series of smaller smooth rollers 2, 3, 4, preferably half the size of the main roller and co-acting closely with it. The uppermost one 2 of these small rollers is placed slightly to the left or feeding side of a vertical line passing through the center of the main roller which is found to effect the purpose of insuring a quick and firm grip of the fed in material. Scrapers 8 are provided consisting of a bent lever with short arm 10, and long arm 11, having a hook for a weight 12, to adjust the pressure of the short arm 10. These scrapers pivot on fulcrums 13. Any suitable gearing connected with driving means such as illustrated is used for operating the rollers. The fibrous substance is fed leaf by leaf in by hand or by any known means between the roller 2 and the main roller 1, preferably the thin end of the leaf first, and is thereby subjected to a high pressure. The scraper 8$^a$ turns the leaf down until it is gripped between the roller 3 and the main roller 1, where it is again subjected to high pressure. The leaf is again turned down by the scraper 8$^b$, until it is gripped between the roller 4 and the main roller 1, where it is again subjected to a high pressure. The leaf is then prevented from following around the main roller by the scraper 8$^d$, and drops out of the machine. It will thus be seen that the fiber is compelled to follow around the main roller and cannot cross strands as in passing from one pair of rollers to another separate pair of rollers and consequently the fiber is not cut or damaged as heretofore. By this mechanism therefore a series of small smooth rollers are worked on one large smooth roller so that the fiber has the advantage of passing through several pairs of rollers and gets a uniform dressing without lifting or crossing each other. In a modification shown in Fig. 4 the machine is adapted to deal with fibrous substances such as broom for converting them into pulp for paper.

In this modification there are two extra rollers provided 5, 6, through which the substance is first fed and crushed before being seized by the rollers 1, 2. This preliminary crushing is all that is needed in connection with the rest of the machine to crush the substance dealt with into a pulp for making paper.

I claim:—

In a fiber disintegrating machine, the combination with a main roller and a plurality of smaller rollers coöperating therewith, the axis of the uppermost of said smaller rollers being disposed at the feed side of a vertical line passing through the axis of the main roller, of a scraper associated with each of said rollers and comprising a pivoted bent lever having a short arm in contact with the roller and a long arm adapted to carry a weight for adjusting the pressure of the scraper on the roller.

In testimony whereof I have signed my name to this specification in the presence of two subscribing witnesses.

SAMUEL NICOLSON.

Witnesses:
CAROLINE KATHLEEN WRIGHT,
DONALD McLENNAN.